UNITED STATES PATENT OFFICE.

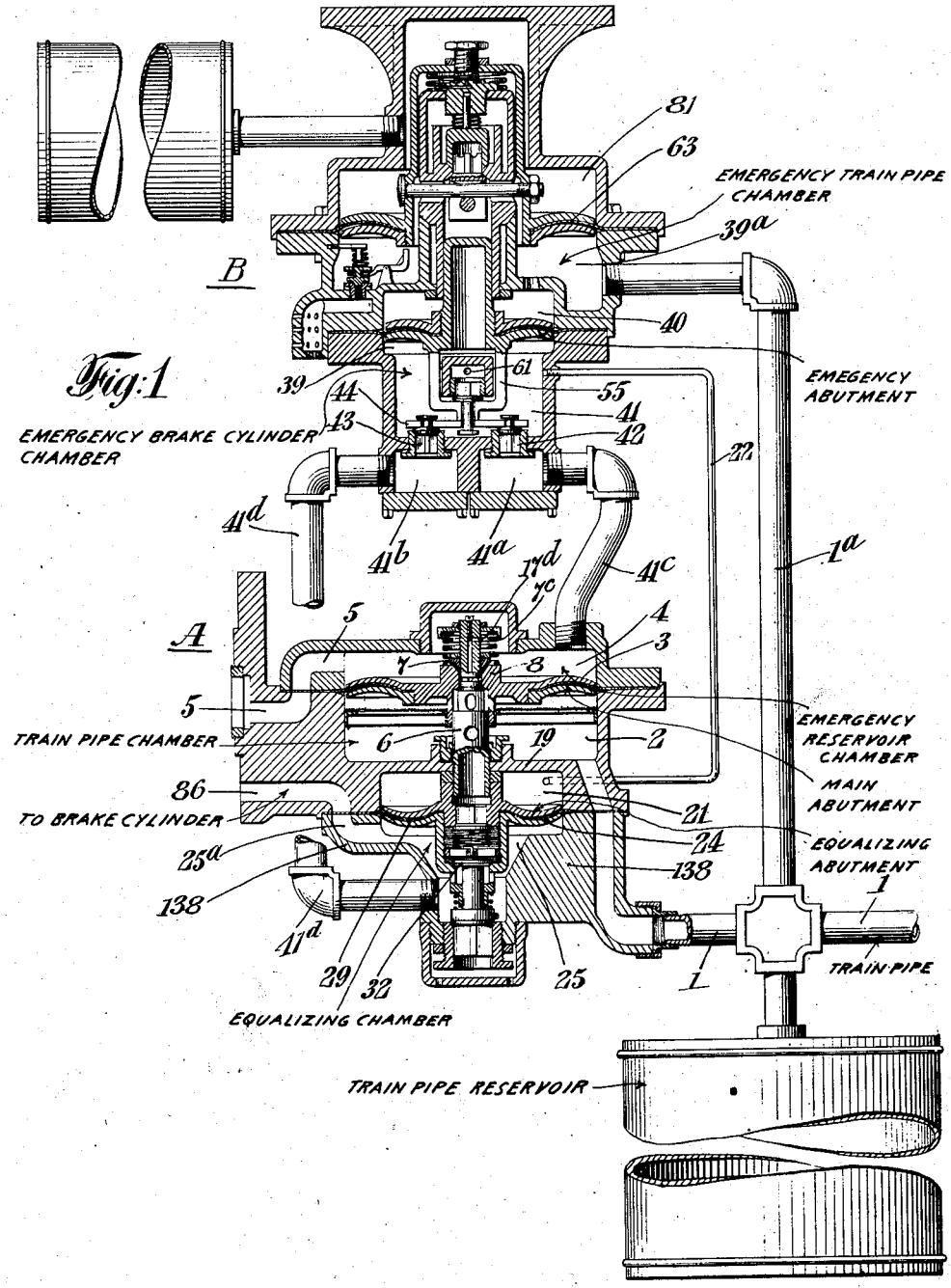

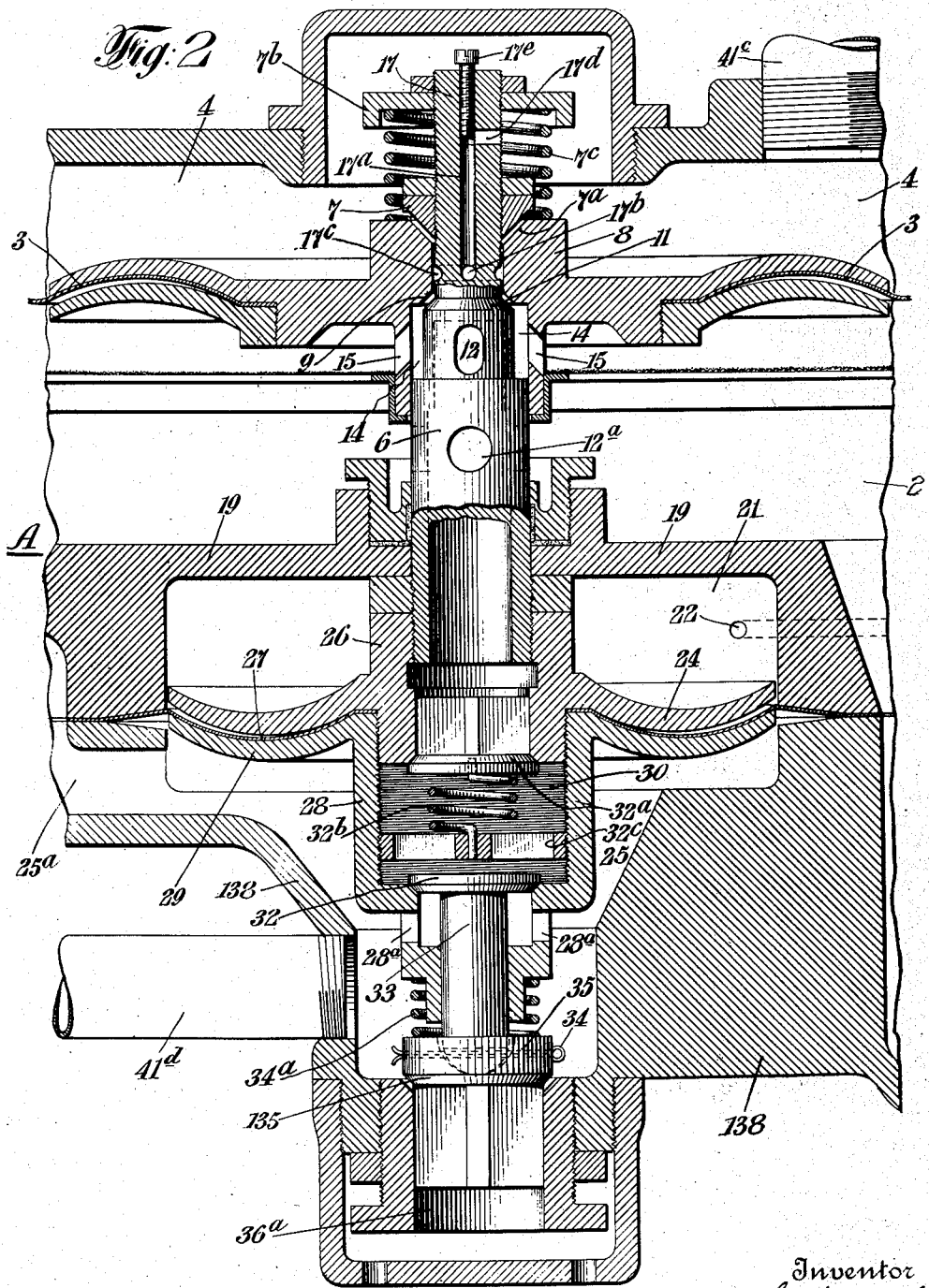

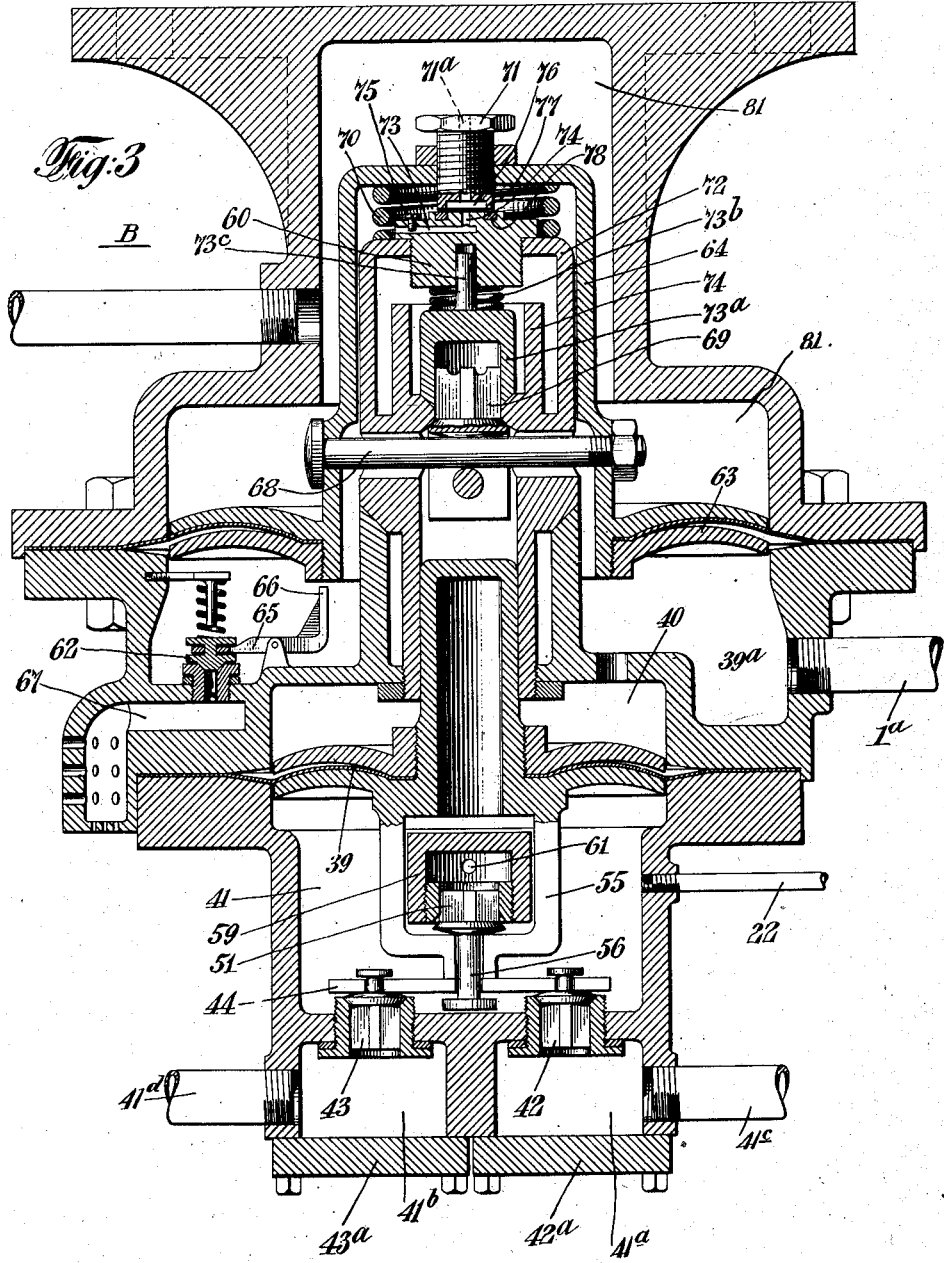

SPENCER G. NEAL, OF LOS ANGELES, CALIFORNIA, ASSIGNOR, BY MESNE ASSIGNMENTS, TO AUTOMATIC STRAIGHT AIR BRAKE COMPANY, OF WILMINGTON, DELAWARE, A CORPORATION OF DELAWARE.

TRIPLE VALVE FOR AIR-BRAKE APPARATUS.

1,314,972.      Specification of Letters Patent.      Patented Sept. 2, 1919.

Application filed February 25, 1916. Serial No. 80,342.

*To all whom it may concern:*

Be it known that I, SPENCER G. NEAL, a citizen of the United States, and resident of the city of Los Angeles, county of Los Angeles, and State of California, have invented certain new and useful Improvements in Triple Valves for Air-Brake Apparatus, of which the following is a specification.

This invention relates more particularly to improvements in that type of triple valve illustrated in my application for patent filed June 10, 1915, Serial No. 33,233, and in my Patent No. 1,082,758, dated December 30, 1913.

One of the important improvements is the provision of means whereby upon a sudden reduction in train pipe pressure sufficient to secure an emergency application of the brakes, the train pipe will be vented to atmosphere through each triple valve. In the operation of brakes on a long train it has been found that a reduction in train pipe pressure sufficient to produce an emergency application of the brakes on the cars near the head end of the train, will not be sufficient to produce an emergency application of the brakes on the cars near the rear end of the train. By providing means whereby each triple valve will vent the train pipe, the wave of reduction will move throughout the train line with great rapidity, securing an emergency application of the brakes throughout the train almost simultaneously without regard to the length of the train. The operation of one triple valve to emergency position positively vents the train line to atmosphere, thereby insuring the triple on the connected car also moving to emergency position. The triple valves will operate serially, the operation of one to emergency position insuring almost a simultaneous operation of the next connected triple, and so on throughout the entire train. The train pipe venting device is operated only by a movable abutment or diaphragm when the said diaphragm is moved to emergency position by a sudden and prolonged reduction in train pipe pressure, so that the said venting operation cannot take place except when an emergency application of the brakes is desired.

Another object of the invention is to provide a pair of positively operated valves to control communication between the emergency reservoir chamber and the equalizing chamber, this latter chamber being directly connected to the brake cylinder. In my application, Serial No. 33,233, mentioned herein, a positively operated valve controls the flow of air from the emergency reservoir chamber to the emergency brake cylinder chamber, from which chamber the air may flow directly to the brake cylinder; and a pressure-seated valve controls communication from the brake cylinder back to the emergency brake cylinder chamber. In the present invention one valve controls the flow of air from the emergency reservoir chamber into the emergency brake cylinder chamber, and the other valve controls the flow of air from said emergency brake cylinder chamber to the equalizing chamber and brake cylinder. Both valves are operated simultaneously both in opening and closing, so that air cannot flow back from the equalizing chamber and brake cylinder to the emergency brake cylinder chamber, as communication between these two chambers will be open only when air is flowing from the emergency reservoir chamber into the emergency brake cylinder chamber.

A further object of the invention is to provide means for slowly charging the emergency reservoirs upon a quick rise of pressure in the train pipe and when there is an excess of pressure in the train pipe, said means operating to rapidly charge the emergency reservoirs upon a slow rise of pressure in the train pipe. It is of great advantage to provide a variable charging means operating upon a sudden rise of train pipe pressure to slowly charge the emergency reservoir, and operating upon a slow rise of train pipe pressure to quickly charge the emergency reservoir. Such device is of especial advantage on long trains where, during the period of release, the rise of train pipe pressure near the head end of the train is very rapid and the rise of train pipe pressure near the rear end of the train is slow. During the period of release there is an excess of pressure in the train pipe at the head end of the train, whereas in the train pipe at the rear end of the train the train pipe pressure rises slowly and there is less liability of an excess pressure. By the use of the charging means described herein the liability of overcharging the emergency reservoirs at the head end of the train is very greatly reduced and a substantially uniform charging of the emergency reservoirs under the varying pressure throughout the train pipe is secured.

Another object of the invention is to provide means whereby the various controlling valves will be positively guided and operated in their movements both in opening and closing. There are other objects and advantages of the invention, relating more particularly to the improvement in the construction of the devices, all of which will be fully hereinafter pointed out.

In the drawings, Figure 1 is a vertical sectional view of the improved triple valve, formed in two sections;

Fig. 2 an enlarged vertical sectional view of that portion of the valve controlling the service application of the brakes and the charging of the apparatus; and Fig. 3 a vertical sectional view of that portion of the triple valve controlling the emergency application of the brakes.

As illustrated in Fig. 1 of the drawings, the triple valve is formed in two sections as two separate devices A and B. Section A contains the parts by which the service applications of the brakes are secured and through which the release of the brakes is obtained, and also through which the apparatus is charged. Section B contains the parts which control the emergency applications of the brakes. This construction and arrangement of the triple valve results in many advantages, and is substantially as shown in my herein mentioned application, Serial No. 33,233. It will, of course, be understood, however, that the new features of construction described herein are applicable to the triple valve when formed as a single or unitary structure, as shown in my aforesaid pending application, and as shown in my Patent No. 1,082,758, dated December 30, 1913. It will, therefore, of course, be understood that I am not to be restricted to the use of my improvements described herein with a two-part or two-section triple valve.

The triple valve is constructed, with a few changes and modifications, almost precisely as shown in my Patent No. 1,082,758, and in my application Serial No. 33,233, and operates precisely as described in said patent, except as modified by the changes in construction described herein. For this reason it is thought unnecessary to minutely and particularly describe herein every part of the triple valve and its operation.

Referring to the various parts by numerals, 1 designates the train pipe which leads into the main train pipe chamber 2 of the triple valve, said chamber being in section A of said valve. Above said chamber 2 and separated therefrom by the main abutment or diaphragm 3, is an emergency reservoir chamber 4 in constant communication with the emergency reservoir through passage 5. In order that said abutment 3 may operate valves hereinafter described the same is made to coöperate with a hollow upright valve stem 6 provided with a reduced upper end. The main diaphragm 3 carries a sliding head 8 which has a working fit around the stem 6 and is provided with a downwardly facing valve seat 9, which coöperates with the charging valve 11, which is a part of upright rod or stem 6. Said valve stem 6 forms a guide for the sliding head 8, so that the air pressures upon the diaphragm 3 may be utilized to positively open and close said valve 11.

Referring more in detail to the construction and operation of the valve device within the head 8, the hollow rod 6 is open at its lower end, but the bore in said rod terminates at a point a little below the valve 11 as indicated by dotted lines in Fig. 2. Air is admitted through inlets 12 into the upper portion of the bore of said rod 6. Said inlets 12 communicate with a clearance 14 around said valve 11. A plurality of ports 15 lead through the wall of the head 8 to admit air to said clearance 14, thence to the inlets 12 which communicate with the interior of the hollow rod 6. The upper portion of hollow rod 6 is provided with a somewhat reduced portion which forms the valve 11 already referred to. Above said valve 11 the stem is provided with a more reduced portion 17, the clearance around which will conduct the air to chamber 4 from around the hollow rod 6 when the valve 11 is opened.

Secured to the reduced portion 17 of the stem 6 above the abutment 3, is a downwardly tapered valve 7 which is adapted to fit a corresponding seat 7ª in the top of the abutment 3. The valve 7 is so placed on the stem 17 that when valve 11 is seated valve 7 will be a considerable distance above seat 7ª. Valve 7 is locked in its adjusted position by a suitable lock nut, as shown in Fig. 2. On the upper end of the stem 17 is a disk 7ᵇ, between which and the upper surface of the sliding head 8 is confined a coil spring 7ᶜ. This spring exerts a force tending to bring valve 11 to its seat 9. The disk 7ᵇ is locked on the stem 17 by means of a suitable lock nut, and, of course, may be adjusted in order to cause the spring 7ᶜ to exert the desired pressure on the abutment 3. There is a considerable clearance between the sliding head 8 of the abutment or diaphragm 3, and the stem 17, so that when the head is between the valves 7 and 11 there will be an air passage of considerable capacity through the abutment.

The stem 17 is bored axially, as at 17ª, from its upper end to a point between the valves 7 and 11 where it communicates with a transverse port 17$^b$. This latter port communicates with an annular groove 17$^c$ in the exterior surface of the reduced stem. Near its upper end the port 17$^a$ communicates with a transverse port 17$^d$, and the extent of the opening between said ports is regulated by an adjustable screw 17$^e$.

Upon a reduction of train pipe pressure in chamber 2 for the purpose of securing an application of the brakes, abutment 3 is moved downwardly by the superior pressure in chamber 4, and valve 11 is seated on the valve seat 9, thereby closing communication between the chambers 2 and 4. Upon an increase of pressure in train pipe chamber 2 for the purpose of securing a release of the brakes, the excessive pressure in chamber 2 will force the abutment 3 upwardly against the tension of spring 7$^c$ and valve 7 will be seated on valve seat 7$^a$. During the period of excessive pressure in chamber 2 air will slowly pass valve 11 through ports 17$^b$, 17$^a$ and 17$^d$, into chamber 4. When the pressure in chamber 2 is again reduced to normal the spring 7$^c$ will, combined with the pressure in chamber 4, move abutment 3 downwardly to bring valve 11 to valve seat 9. As the pressure in chamber 2 is reduced to normal, abutment 3 will be moved back to valve 11. When the sliding head 8 of abutment 3 is between the valves 7 and 11, air from chamber 4 may pass around said valves to chamber 2.

In originally charging the apparatus, if the rise of train pipe pressure is rapid, air will pass from chamber 2 slowly, around valve 11 and through ports 17$^b$, 17$^a$ and 17$^d$, to chamber 4 and the emergency reservoir. If the rise in pressure in the train pipe and in chamber 2 is slow, air will pass rapidly and in considerable quantities around valve 11, through the clearance between the head 8 and the reduced valve stem 17, around valve 7 into chamber 4, and at the same time air will pass through the ports 17$^b$, 17$^a$ and 17$^d$. This will provide a very quick charging of the emergency reservoir and the chamber 4. It is only when there is a considerable excess pressure in chamber 2 that the valve 7 will be seated and the slow charging will take place through the ports in the valve stem 17. By providing a restricted charging port when there is an excess of pressure in chamber 2 and where the rise in train pipe pressure is rapid, the liability of overcharging of the chamber 4 and emergency reservoir is greatly reduced. When the train pipe pressure is rapidly increased in order to release the brakes on a long train, there is an excess of pressure in the train pipe near the head end of the train, and consequently an excess of pressure in the train pipe chambers 2 of the triple valves near the head end of the train. The pressure in the train pipe at the rear end of the train is considerably less than at the head end of the train during the period of release. The result of this is that during the period of release there are different degrees of pressure at the two ends of the train, and different rates of rise in the pressure. It is, therefore, desirable to restrict the ports through which the emergency reservoirs at the head end of the train are charged under the excessive pressure which exists at that end of the train, and to provide ample ports for the charging of the emergency reservoirs near the rear end of the train, in order that the emergency reservoir pressures throughout the train will be substantially uniform. It will, of course, be understood that under no conditions will the excessive pressure in chamber 4 and its connected emergency reservoir be very considerable, for the reason that the charging ports are greatly restricted and the period of excessive pressure in chamber 2 is too short to permit of the accumulation of any considerable excessive pressure in chamber 4. It is also manifest that air will pass through ports 17$^d$, 17$^a$ and 17$^b$ and around valve 11, during the movement of the sliding head 8 from valve 7 to valve 11.

Beneath the train pipe chamber 2 and separated therefrom by a cross wall 19, is a chamber 21. An equalizing abutment 24 extends across the lower side of the chamber 21 to separate said chamber from an equalizing chamber 25. Chamber 21 is connected to emergency brake cylinder chamber 41 (which will be hereinafter described), by a pipe 22, so that the pressure in the said two chambers will be the same at all times. In the embodiment of the invention illustrated in the drawings, the main abutment 3 is about twice as large as the equalizing abutment 24. Therefore, the reduction of train pipe pressure ten pounds will cause approximately twenty pounds' pressure to be built up in the brake cylinder and in the equalizing chamber 25 before there will be enough pressure beneath said equalizing abutment to lift the rod 6 and close valve 32, all of which is clearly set out in my aforesaid patent. Hollow rod 6 at its lower end screws into a hub 26 formed on the upper side of flange 27 of the equalizing abutment 24. A nut locks the hub to the stem and said nut is adapted to engage the under side of the cross wall 19 to limit the upward movement of the rod. The flange 27 is formed with a central depending hollow stem which screws into the upper end of a valve cage 28, said valve cage carrying the lower abutment flange 29 for the abutment 24. The said valve cage and rod afford communication between the equalizing chamber 25 and the train pipe chamber 2. The valve cage 28 forms a small chamber 30, the outlet of which is controlled by a valve 32 seating downwardly and having a downwardly extending stem 33 carrying at its lower end an exhaust valve 35 which opens and closes a vent 36ª. The lower end of the stem 33 is loosely connected to the valve 35 by pin 34, whereby said valve will be free to seat squarely and truly on the valve seat 135. The valve cage 28 is also provided with passages 28ª below valve 32. Equalizing chamber 25 is formed by casing 138 upon the lower end of which is screwed a protecting cap. Chamber 25 is in direct communication with the brake cylinder through port 25ª and passage 86.

Valve 32ª is held to its seat by means of a spring 32ᵇ, the lower end of said spring being seated in a spider arm 32ᶜ within the chamber 30, said arm being spaced sufficiently far above the valve 32 to permit it to have a free opening movement. Valve 32ª prevents air passing back to the train pipe chamber 2 during an emergency application of the brakes, and when the brake cylinder pressure exceeds train pipe pressure, all of which is fully set out in my aforesaid application for patent. Valve 35 is held yieldingly to its seat by spring 34ª which is placed between the lower end of the valve cage 28 and the upper surface of valve 35. This spring also serves to yieldingly hold valve 35 on its seat when the abutment 24 is depressed to secure an application of the brakes.

The train pipe 1 is in direct communication with chamber 39ª through pipe 1ª, and said chamber is in communication with emergency train pipe chamber 40 as fully described in my aforesaid patent. Chamber 39ª and emergency train pipe chamber 40 are in section B of the triple, as shown clearly in Figs. 1 and 3. Below emergency brake cylinder chamber 41 are formed two independent chambers 41ª and 41ᵇ. Chamber 41ª is in direct communication with emergency reservoir chamber 4 through pipe 41ᶜ. Chamber 41ᵇ is in direct communication with equalizing chamber 25 through pipe 41ᵈ. Communication between the emergency reservoir chamber 4 and the emergency brake cylinder chamber is controlled by a valve 42 arranged within the chamber 41 and seating downwardly. Communication between chamber 25 and the emergency brake cylinder chamber is controlled by a valve 43 arranged within the chamber 41 and seating downwardly. Valves 42 and 43 are connected together by a cross bar 44 arranged in the chamber 41. The emergency brake cylinder chamber 41 is separated from emergency train pipe chamber 40 by the emergency abutment 39. Depending from the abutment 39 is a yoke 55. This yoke is connected by a stem 56 to the cross bar 44, so that when the abutment 39 is moved upwardly by pressure in chamber 41 valves 42 and 43 are opened, thereby establishing communication between the emergency reservoir chamber 4, emergency brake cylinder chamber 41, and thence through valve 43, chamber 41ᵇ, chamber 25 to brake cylinder. When valves 42 and 43 are closed communication between chamber 25 and emergency brake cylinder chamber 41 is closed, and brake cylinder air cannot flow to said chamber 41.

Emergency brake cylinder chamber 41 is vented to atmosphere through the hollow arm 59 and small port 61 leading therefrom to the atmosphere. A valve 51 controls communication between the arm 59 and the interior of the chamber 41, and said valve is carried by the yoke 55. As shown in Fig. 3 of the drawings, when valves 42 and 43 are closed valve 51 is open, thereby venting the chamber 41 to atmosphere through port 61. When, however, the emergency abutment 39 is raised valve 51 is closed. When valve 51 is open chamber 21 is vented to atmosphere through pipe 22, chamber 41, arm 59 and port 61. When, however, the valve 51 is closed and valves 42 and 43 are open, emergency pressure in chamber 41 passes through pipe 22 to chamber 21 above abutment 24.

The emergency abutment 63 separates supplemental chamber 81 from the chamber 39ª and emergency train pipe chamber 40, and carries the dome 64, precisely as shown and described in my Patent No. 1,082,758. Valve 69 is operated by said dome through the rod 68 to admit the train pipe air into emergency brake cylinder chamber 41 upon a sudden and pronounced reduction in train pipe pressure in chamber 39ª, precisely as described in my aforesaid patent, and it will not be necessary to more particularly describe herein that feature of the triple valve.

In the chamber 39ª is mounted a valve 62 which is adapted to be opened by a pivoted lever 65 whose upper end 66 is in a position to be engaged by the abutment 63 when said abutment has moved downwardly a predetermined distance due to a sudden reduction in train pipe pressure. Valve 62 controls communication between the chamber 39ª and atmosphere through a passage 67. Upon a sudden and pronounced reduction in train pipe pressure for the purpose of securing an emergency application of the brakes, supplemental abutment 63 will move downwardly a sufficient distance to engage the upper end 66 of the pivoted valve-operating lever 65 and thereby open valve 62. This will vent chamber 39ª and its connected emergency train pipe chamber 40 direct to atmosphere through passage 67. By thus venting the train pipe and the emergency train pipe chambers of the triple valves to atmosphere, the wave of train pipe reduction will move down the train with great rapidity and thereby secure the almost simultaneous emergency application of the brakes on each car. This local venting of the train pipe for each brake unit is of great importance in securing an emergency application of the brakes throughout the train, and avoids the necessity of reducing train pipe pressure entirely through the engineer's valve.

By providing the positively actuated valve 43 for controlling communication between the emergency brake cylinder chamber and the brake cylinder chamber 25, all danger of air passing from the brake cylinder to the chamber 41 and thence to atmosphere, is avoided. It is also of advantage to provide means whereby there will be no communication between chamber 41 and the brake cylinder chamber, except when valve 42 is open to permit air to pass from the emergency reservoir chamber into chamber 41. Chambers 41$^a$ and 41$^b$ are each separately closed by plates 43$^a$ and 42$^a$, which plates form the bottom of the section B of the triple valve, so that access to either valve 42 or 43 may be had for purposes of adjustment, or otherwise, without disturbing any other part of the apparatus in section B.

As shown in my Patent No. 1,082,758, chamber 39$^a$ is in direct communication with the top of the dome 64 and the interior of said dome is in communication with the supplemental chamber 81, in order that said chamber may be charged, and also so that the air pressure therein may leak down to equalize with the pressure in chambers 39$^a$ and 40. I provide means herein for controlling communication between chamber 81 and the interior of the dome 64. This means consists of a central plug 71 screwed through the center of the top of the dome 64, said plug being formed with a central aperture 71$^a$ of considerable capacity. Screwed into the top of the valve cage 72 which forms a rigid portion of the valve device, is a central plug or cap 60. This cap, above the valve cage 72, is formed with a laterally extending port 73, and with a central vertical port 74 communicating with the port 73. A screw 75 regulates the size of the outlet through port 73, said port communicating with the interior of the dome 64 at the top thereof. The lower end of the screw plug 71 is recessed annularly as at 76, to provide the marginal flange 77. This flange is adapted to engage a washer 78 carried by the plug 60 on its upper surface and surrounding the port 74. Port 74 and the outlet from port 73 are of considerably less capacity than port 71$^a$. The result of this is that when the supplemental abutment 63 is depressed upon a reduction of train pipe pressure, communication between chamber 81 and the interior of the dome 64 is considerably restricted, so that the pressure in said chamber 81 is slowly leaked down to equalize with the pressure in chamber 39$^a$. When, however, the chamber 81 is being charged through chamber 39$^a$ and dome 64, as described in my aforesaid patent, the air may pass unrestricted through the larger port 71$^a$. By regulating the outlet from port 73 the time required to equalize pressures in chambers 81 and 39$^a$ may be fixed as desired. Between the top of the valve cage 72 and the upper wall of the dome 64, is a spiral spring 70 which restores dome 64 and the parts connected therewith upward to their normal position upon an equalization of pressures in chambers 39$^a$ and 81.

When valve 69 is lowered through the operation of the supplemental abutment 63, air pressure from chamber 39$^a$ is admitted from below and lifts the cup-like check valve 73$^a$, and passes up into valve cage 72 and thence into emergency brake cylinder chamber 41, as described in my aforesaid patent. To maintain the check valve 73$^a$ properly seated I provide a light coil spring 73$^b$; and to guide the said check valve in its vertical movements I provide it with a stem 73$^c$ which fits and slides in a central aperture in the plug 60. By this means the valve 73$^a$ is guided in its vertical movements and caused to fit accurately on its seat.

What I claim is:

1. A triple valve provided with a main train pipe chamber, an equalizing chamber adapted to be placed in direct communication with a brake cylinder, an emergency reservoir chamber adapted to be placed in direct communication with an emergency reservoir, an emergency brake cylinder chamber, means operated by a decrease in train pipe pressure to place the train pipe chamber in communication with the equalizing chamber for a service application of the brakes, means operated by a sudden decrease in train pipe pressure to place the emergency reservoir chamber in communication with the emergency brake cylinder chamber, and additional means operated by said sudden decrease in train pipe pressure to place the emergency brake cylinder chamber in communication with the equalizing chamber for an emergency application of the brakes.

2. A triple valve provided with a main train pipe chamber, an equalizing chamber adapted to be placed in direct communication with a brake cylinder, an emergency reservoir chamber adapted to be placed in direct communication with an emergency reservoir, an emergency brake cylinder chamber, means operated by a decrease in train pipe pressure to place the train pipe chamber in communication with the equalizing chamber for a service application of the brakes, a pair of valves controlling communication between the emergency reservoir and the emergency brake cylinder chamber and from said latter chamber to the equalizing chamber, and means operated by a sudden decrease in train pipe pressure to simultaneously open said valves for an emergency application of the brakes, said means operating to positively close said valves when the apparatus is restored to normal condition.

3. A triple valve formed with a train pipe chamber, an equalizing chamber, an emergency reservoir chamber, an emergency brake cylinder chamber, means for placing the emergency brake cylinder chamber in communication with the equalizing chamber, means operated upon a slow reduction of train pipe pressure to place the train pipe chamber in communication with the equalizing chamber, means operated by a quick reduction in train pipe pressure to place the emergency reservoir chamber in communication with the emergency brake cylinder chamber, and means operated to vent the train pipe to atmosphere when the emergency reservoir chamber is placed in communication with the emergency brake cylinder chamber.

4. A triple valve comprising means operating upon a moderate reduction of train pipe pressure to admit train pipe air to the brake cylinder for a service application of the brakes, means operating upon a sudden and prolonged reduction of train pipe pressure to admit emergency reservoir air to the brake cylinder for an emergency application of the brakes, and means operated by said sudden and prolonged reduction of train pipe pressure to vent the train pipe to atmosphere during an emergency application of the brakes.

5. A triple valve comprising an abutment adapted to be moved by a reduction of train pipe pressure, means operated by said abutment to admit air from the train pipe to the brake cylinder for a service application of the brakes, a supplemental abutment adapted to be moved by a sudden and prolonged reduction in train pipe pressure, an emergency reservoir means operated by said supplemental abutment to admit emergency reservoir air to the brake cylinder to secure an emergency application of the brakes, and means operated by said supplemental abutment to vent the train pipe to atmosphere during an emergency application of the brakes.

6. A triple valve comprising means operated upon a reduction of train pipe pressure to admit train pipe air to the brake cylinder for a service application of the brakes, means operated upon a sudden and pronounced reduction of train pipe pressure to admit air to the brake cylinder for an emergency application of the brakes, and means within the triple valve operating upon a sudden and pronounced reduction in train pipe pressure to vent the train pipe to atmosphere through said triple valve.

7. A triple valve provided with a train pipe chamber and an emergency reservoir chamber, a movable abutment separating said chambers, a pair of valves controlling communication therebetween and operated by the abutment, one of said valves being in the train pipe chamber and the other in the emergency reservoir chamber, a charging port communicating at one end with the emergency reservoir chamber and at its other end with the train pipe chamber, said port being open when the abutment is against the valve in the emergency reservoir chamber, and being closed when the abutment is against the valve in the train pipe chamber, and means in the emergency reservoir chamber for opposing the pressure in the train pipe chamber.

8. A triple valve provided with a train pipe chamber and an emergency reservoir chamber, a movable abutment separating said chambers, a pair of valves controlling communication therebetween and operated by the abutment, one of said valves being in the train pipe chamber and the other in the emergency reservoir chamber, and means to slowly charge the emergency reservoir chamber when the abutment is against the valve in the emergency reservoir chamber, said charging means being inoperative when the abutment is against the valve in the train pipe chamber.

9. A triple valve provided with a train pipe chamber and an emergency reservoir chamber, a movable abutment separating said chambers, a pair of valves controlling communication therebetween and operated by the abutment, one of said valves being in the train pipe chamber and the other in the emergency reservoir chamber, means to slowly charge the emergency reservoir chamber when the abutment is against the valve in the emergency reservoir chamber, said charging means being inoperative when the abutment is against the valve in the train pipe chamber, and a spring in the emergency reservoir chamber bearing on the abutment and exerting a pressure to seat the valve in the train pipe chamber.

10. A triple valve provided with a main train pipe chamber, an equalizing chamber adapted to be placed in direct communication with a brake cylinder, an emergency reservoir chamber adapted to be placed in direct communication with an emergency reservoir, an emergency brake cylinder chamber, means operated by a decrease in train pipe pressure to place the train pipe chamber in communication with the equalizing chamber for a service application of the brakes, means operated by a sudden decrease in train pipe pressure to admit air into the emergency brake cylinder chamber, means operated by air pressure admitted to said emergency brake cylinder chamber to place the emergency reservoir chamber in communication with the brake cylinder for an emergency application of the brakes and means operated by said sudden decrease in train pipe pressure to vent train pipe to atmosphere.

11. A triple valve provided with a main train pipe chamber, an equalizing chamber adapted to be placed in direct communication with a brake cylinder, an emergency reservoir chamber adapted to be placed in direct communication with an emergency reservoir, an emergency brake cylinder chamber, means operated by a decrease in train pipe pressure to place the train pipe chamber in communication with the equalizing chamber for a service application of the brakes, an emergency brake cylinder chamber normally open to atmosphere, means operated by a sudden decrease in train pipe pressure to admit air into the emergency brake cylinder chamber, means operated by air pressure within the emergency brake cylinder chamber to close the vent from said chamber and to open communication from said chamber to the brake cylinder and to the emergency reservoir chamber for an emergency application of the brakes, and means operated by said sudden decrease in train pipe pressure to vent the train pipe to atmosphere.

12. A triple valve provided with a main train pipe chamber, an equalizing chamber adapted to be placed in direct communication with a brake cylinder, an emergency reservoir chamber adapted to be placed in direct communication with an emergency reservoir, an emergency brake cylinder chamber, means operated by a decrease in train pipe pressure to place the train pipe chamber in communication with the equalizing chamber for a service application of the brakes, means operated by a sudden decrease in train pipe pressure to admit train pipe air into the emergency brake cylinder chamber, means operated by air pressure admitted to said emergency brake cylinder chamber to place the emergency reservoir chamber in communication with the brake cylinder for an emergency application of the brakes, and means operated by a sudden decrease in train pipe pressure to vent the train pipe to atmosphere.

13. A triple valve provided with a main train pipe chamber, an emergency train pipe chamber, an equalizing chamber adapted to be placed in communication with a brake cylinder, an emergency reservoir chamber adapted to be placed in communication with an emergency reservoir, an emergency brake cylinder chamber, means operated by a decrease in train pipe pressure to place the train pipe chamber in communication with the equalizing chamber for a service application of the brakes, means operated by a sudden decrease in train pipe pressure to admit air into the emergency brake cylinder chamber, means operated by said sudden decrease in train pipe pressure to vent the emergency train pipe chamber to atmosphere, and means operated by air pressure admitted to said emergency brake cylinder chamber to place the emergency reservoir chamber in communication with the brake cylinder for an emergency application of the brakes.

14. A triple valve provided with a main train pipe chamber, an equalizing chamber adapted to be placed in direct communication with a brake cylinder, an emergency reservoir chamber adapted to be placed in direct communication with an emergency reservoir, an emergency brake cylinder chamber, means operated by a decrease in train pipe pressure to place the train pipe chamber in communication with the equalizing chamber for a service application of the brakes by train pipe pressure alone, a pair of valves controlling communication between the emergency reservoir chamber and the emergency brake cylinder chamber and from said latter chamber to the equalizing chamber, means for holding said valves closed by train pipe pressure, and means operating upon a sudden reduction of train pipe pressure to release the air pressure from said valve holding means.

15. A triple valve provided with a main train pipe chamber, an equalizing chamber adapted to be placed in direct communication with a brake cylinder, an emergency reservoir chamber adapted to be placed in direct communication with an emergency reservoir, an emergency brake cylinder chamber, means operated by a decrease in train pipe pressure to place the train pipe chamber in communication with the equalizing chamber for a service application of the brakes by train pipe pressure alone, a pair of valves controlling communication between the emergency reservoir chamber and the emergency brake cylinder chamber and from said latter chamber to the equalizing chamber, means for holding said valves closed by train pipe pressure, means operating upon a sudden reduction of train pipe pressure to release the air pressure from said valve holding means.

16. A triple valve provided with a train pipe chamber and an emergency reservoir chamber, a movable abutment separating said chambers, a movable valve stem extending through said abutment, brake cylinder inlet and exhaust valves controlled by said valve stem, a pair of valves carried by said stem and controlling communication between the train pipe chamber and the emergency reservoir chamber one of said valves being in the train pipe chamber and the other in the emergency reservoir chamber, the movable abutment being arranged to vibrate between said valves said movable abutment loosely surrounding the valve stem between the valves, and a charging port communicating at one end with the emergency reservoir chamber and at its other end with the space between the said valves, said port being open when the abutment is against the valve in the emergency reservoir chamber and closed when the abutment is against the valve in the train pipe chamber, an additional free passage past the two valves being open when the abutment is between said two valves.

17. A triple valve provided with a train pipe chamber and an emergency reservoir chamber, a movable abutment separating said chambers, a movable valve stem extending through said abutment, brake cylinder inlet and exhaust valves controlled by said valve stem, a pair of valves carried by said stem and controlling communication between the train pipe chamber and the emergency reservoir chamber one of said valves being in the train pipe chamber and the other in the emergency reservoir chamber, the movable abutment being arranged to vibrate between said valves said movable abutment loosely surrounding the valve stem between the valves, a charging port communicating at one end with the emergency reservoir chamber and at its other end with the space between the said valves, said port being open when the abutment is against the valve in the emergency reservoir chamber and closed when the abutment is against the valve in the train pipe chamber, an additional free passage past the two valves being open when the abutment is between said two valves, and means operating on the abutment in opposition to the pressure in the train pipe chamber and normally tending to seat the abutment on the valve in said chamber.

18. A triple valve provided with a train pipe chamber and an emergency reservoir chamber, a movable abutment separating said chambers, a movable valve stem extending through said abutment, brake cylinder inlet and exhaust valves controlled by said valve stem, a pair of valves carried by said stem and controlling communication between the train pipe chamber and the emergency reservoir chamber one of said valves being in the train pipe chamber and the other in the emergency reservoir chamber, the movable abutment being arranged to vibrate between said valves said movable abutment loosely surrounding the valve stem between the valves, a charging port communicating at one end with the emergency reservoir chamber and at its other end with the space between the said valves, said port being open when the abutment is against the valve in the emergency reservoir chamber and closed when the abutment is against the valve in the train pipe chamber, an additional free passage past the two valves being open when the abutment is between said two valves, and a spring in the emergency reservoir chamber bearing on the abutment and tending to cause said abutment to seat on the valve in the train pipe chamber.

19. A triple valve provided with a train pipe chamber and an emergency reservoir chamber, a movable abutment separating said chambers, a movable valve stem extending through said abutment, brake cylinder inlet and exhaust valves controlled by said valve stem, a pair of valves carried by said stem and controlling communication between the train pipe chamber and the emergency reservoir chamber one of said valves being in the train pipe chamber and the other in the emergency reservoir chamber, the movable abutment being arranged to vibrate between said valves said movable abutment loosely surrounding the valve stem between the valves, one of said valves being adjustable on the valve stem to vary the distance between said valves, and a charging port communicating at one end with the emergency reservoir chamber and at its other end with the space between the said valves, said port being open when the abutment is against the valve in the emergency reservoir chamber and closed when the abutment is against the valve in the train pipe chamber, an additional free passage past the two valves being open when the abutment is between said two valves.

20. A triple valve comprising two independent casings, means in one of said casings to control train pipe air for all service applications of the brakes upon a slow decrease in train pipe pressure and to secure the release of the brakes upon an increase in train pipe pressure, and means in the other casing to control emergency reservoir air for all emergency applications of the brakes upon a sudden decrease in train pipe pressure said other casing also containing means to vent the train pipe to atmosphere upon said sudden decrease in train pipe pressure.

21. A triple valve provided with a train pipe chamber, an emergency reservoir chamber, a movable abutment between said chambers, a movable valve stem, brake cylinder inlet and exhaust valves controlled by the movements of said stem, a pair of valves on said stem on opposite sides of the movable abutment and between which said abutment is adapted to vibrate, and means whereby the emergency reservoir chamber may be quickly recharged around the valves on the valve stem when the abutment is between said valves and may be slowly recharged when the abutment is seated on the valve in the emergency reservoir, said charging means being closed when the abutment is seated on the valve in the train pipe chamber.

22. A triple valve provided with a train pipe chamber and an emergency reservoir chamber, a movable valve stem, a pair of valves mounted loosely on said stem and adapted to control the brake cylinder inlet and the brake cylinder exhaust, a movable abutment between the emergency reservoir chamber and the train pipe chamber, said abutment being adapted to operate the valve stem but having a slight movement independent thereof, and a charging means between the said two chambers and controlled by the movable abutment and whose charging capacity will be large upon a slow rise of train pipe pressure and restricted upon a rapid rise in train pipe pressure.

23. A triple valve provided with a train pipe chamber, an emergency reservoir chamber, a movable abutment separating said chambers, a reciprocable valve stem extending through said abutment, means to permit said abutment to have a restricted movement independent of said valve stem and being adapted to move said stem at either end of its said restricted movement, a charging means between the train pipe chamber and the emergency reservoir controlled by the said restricted independent movement of the abutment, and brake cylinder inlet and exhaust valves controlled by the movement of the said valve stem.

24. A triple valve provided with a train pipe chamber, an emergency reservoir chamber, a movable abutment separating said chambers, brake cylinder inlet and exhaust valves operated by said abutment, and means operating upon a sudden decrease in train pipe pressure to admit emergency reservoir air to the brake cylinder for an emergency application of the brakes and venting the train pipe to atmosphere.

In testimony whereof I hereunto affix my signature.

SPENCER G. NEAL.